United States Patent
Azimipour et al.

(10) Patent No.: US 7,612,145 B2
(45) Date of Patent: Nov. 3, 2009

(54) COMPOSITE MATERIAL CONTAINING NON-FUNCTIONAL AROMATIC END GROUP-CONTAINING POLYMER

(75) Inventors: Bahar Azimipour, Collegeville, PA (US); Chuen-Shyong Chou, Ambler, PA (US); Edward E. LaFleur, Holland, PA (US); Nazir Ahmed Memon, Yardley, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 11/901,394

(22) Filed: Sep. 17, 2007

(65) Prior Publication Data
US 2008/0078976 A1    Apr. 3, 2008

Related U.S. Application Data

(60) Provisional application No. 60/827,349, filed on Sep. 28, 2006.

(51) Int. Cl.
*C08L 25/02* (2006.01)
(52) U.S. Cl. .................. 525/241; 525/191; 524/500; 524/502
(58) Field of Classification Search .................. 525/411
See application file for complete search history.

(56) References Cited

U.S. PATENT DOCUMENTS

| 4,324,866 | A  | * | 4/1982 | Furuichi et al. | 521/140 |
| 5,115,028 | A  | * | 5/1992 | Gebizlioglu et al. | 525/232 |
| 6,437,030 | B1 | * | 8/2002 | Coran et al. | 524/101 |
| 6,946,084 | B2 |   | 9/2005 | Nakagawa et al. | |
| 2005/0049361 | A1 | * | 3/2005 | LaFleur | 525/107 |
| 2005/0239964 | A1 |   | 10/2005 | Chou | |
| 2006/0157350 | A1 |   | 7/2006 | Williamson et al. | |

FOREIGN PATENT DOCUMENTS

EP      1 619 212 A1   1/2006
WO   WO 2004/096875 A1   4/2004

OTHER PUBLICATIONS

Zweifel, Hans. Plastics Additives Handbook, 5th ed. Hanser Gardner Publications. Cincinnati, OH: 2001; p. 9.*

* cited by examiner

*Primary Examiner*—Randy Gulakowski
*Assistant Examiner*—Kyle Baumstein
(74) *Attorney, Agent, or Firm*—Stephen T. Falk

(57) ABSTRACT

A composite material containing a thermoplastic material and a non-functional aromatic end group-containing polymer is disclosed. Also disclosed are methods of making and use the composite materials.

13 Claims, No Drawings

COMPOSITE MATERIAL CONTAINING NON-FUNCTIONAL AROMATIC END GROUP-CONTAINING POLYMER

This application claims the benefit of priority under 35 U.S.C. §119(e) of U.S. Provisional Patent Application No. 60/827,349 filed on Sep. 28, 2006.

The present invention relates to toughened thermoplastic materials and methods of preparing the same.

Thermoplastic materials are finding use in an increasing array of applications. Many of these applications call for thermoplastic materials with improved impact strength. Notwithstanding, it has proven extremely difficult to formulate thermoplastics that have improved impact strength while retaining other important properties such as flowability and heat resistance.

One approach to improving the impact strength of thermoplastic resins is disclosed by Nakagawa et al. in U.S. Pat. No. 6,946,084. Nakagawa et al. disclose the use of a block copolymer modifier to improve the impact strength of a thermoplastic resin. The Nakagawa et al. block copolymer is disclosed as a mixture of two or more block copolymers comprising a block copolymer containing a polymer block mainly composed of an aromatic vinyl compound in an amount of 55 wt % or more but less than 90 wt % and a block copolymer containing a polymer block mainly composed of an aromatic vinyl compound in an amount of 20 wt % or more but less than 55 wt %, and one of the polymer block mainly composed of an aromatic vinyl compound in the mixture has a number average molecular weight of 10,000 or more but less than 30,000 and one of the polymer block mainly composed of a conjugated diene compound in the mixture has a number average molecular weight of 50,000 or more but less than 100,000.

Notwithstanding, there remains a need for new modifiers for thermoplastic materials that improve the properties of thereof, including for example toughness.

In one aspect of the present invention, there is provided a composite material comprising: a thermoplastic material; and, a liquid rubber; wherein the liquid rubber has a glass transition temperature of less than 25° C., a weight average molecular weight of $\geq 1,069$ g/mol and comprises polymer chains that have at one or more non-functional aromatic terminal end-group; wherein the thermoplastic material is a thermoplastic polymer and wherein the liquid rubber is miscible with the thermoplastic material in a liquid state and immiscible with the thermoplastic material in a solid state.

In another aspect of the present invention, there is provided a product comprising a composite material of the present invention, wherein the product is selected from packaging materials, auto parts, food trays, cell phone housings and electrical equipment housings.

In another aspect of the present invention, there is provided a method for preparing a composite material, comprising: (a) providing a thermoplastic material; (b) providing a liquid rubber; and, (c) combining the liquid rubber with the thermoplastic material; wherein the liquid rubber has a glass transition temperature of less than 25° C., a weight average molecular weight of $\geq 1,069$ g/mol and comprises polymer chains that have at one or more non-functional aromatic terminal end-group; wherein the liquid rubber is miscible in the thermoplastic material in a liquid state and immiscible in the thermoplastic material in a solid state.

In another aspect of the present invention, there is provided a method for improving toughness of a thermoplastic material, comprising: providing a combination of a thermoplastic material and a liquid rubber; wherein the liquid rubber has a glass transition temperature of less than 25° C., a weight average molecular weight of $\geq 1,069$ g/mol and comprises polymer chains that have at one or more non-functional aromatic terminal end-group; wherein the liquid rubber is miscible in the thermoplastic material in a liquid state and immiscible in the thermoplastic material in a solid state and wherein the toughness of the combined thermoplastic material and liquid rubber is greater than the toughness of the thermoplastic material in the absence of the liquid rubber.

The term "liquid state" as used herein and in the appended claims in reference to the thermoplastic material encompasses: (a) liquid monomer before polymerization to form a thermoplastic polymer; (b) liquid oligomer before polymerization to form a thermoplastic polymer; (c) combinations of liquid monomer and liquid oligomer before polymerization to form a thermoplastic polymer; (d) molten thermoplastic polymer.

The term "solid state" as used herein and in the appended claims in reference to the thermoplastic material refers to a thermoplastic polymer in a non-molten state.

The term "thermoplastic polymer" as used herein and in the appended claims refers to polymers that are reversibly deformable (able to be softened) after being heated above their softening or glass transition temperatures and then cooled. Thermoplastic polymers are capable of being repeatedly melt processed in plastic manufacturing machinery such as an extruder.

The term "Liquid Rubber" as used herein and in the appended claims refers to a material that exhibits a glass transition temperature of less than 25° C., a weight average molecular weight of at least 1,069 g/mol and comprises polymer chains that have at least one non-functional aromatic terminal end-group.

The term "miscible" as used herein and in the appended claims means that the liquid rubber and the thermoplastic material in the liquid state remain in a single liquid phase over extended periods of time according to the principles of thermodynamics.

The term "immiscible" as used herein and in the appended claims means not miscible.

The term "phase separated" as used herein and in the appended claims refers to matter having two or more distinct phases according to the principals of thermodynamics.

The term "parts" as used herein and in the appended claims means "parts by weight", unless otherwise stated. One of ordinary skill in the art will understand that "total parts by weight" do not necessarily add to 100.

The term "weight percent" as used herein and in the appended claims means "parts by weight per hundred".

The term "alkyl" as used herein and in the appended claims refers to linear, branched and cyclic saturated hydrocarbon chemical groups.

The term "$C_N$ alkyl", where N is a number, refers to saturated alkyl groups comprised of N carbon atoms.

The term "molecular weight" as used herein and in the appended claims refers to weight average molecular weight, unless clearly stated otherwise.

The term "daltons" and "g/mol" as used herein and in the appended claims refers to "grams per mole".

The use of the term "(meth)" followed by another term such as acrylic, acrylate, acrylamide, etc., as used herein and in the appended claims, refers to, for example, both acrylic and methacrylic; acrylate and methacrylate; acrylamide and methacrylamide; etc.

The glass transition temperature ("Tg") is measured by differential scanning calorimetry (DSC) taking the mid-point in the heat flow versus temperature transition as the Tg value.

The term "low $T_g$ monomers" as used herein and in the appended claims means a monomer, the homopolymer of which has a Tg of <25° C.

All ranges disclosed herein are inclusive and combinable.

In some embodiments of the present invention, the liquid rubber comprises ≧25 wt % polymer chains having at least one non-functional aromatic terminal end-group. In some aspects of these embodiments, the liquid rubber comprises ≧30 wt % polymer chains having at least one non-functional aromatic terminal end-group.

In some embodiments of the present invention, the liquid rubber comprises flexible polymer chains that have at least one non-functional aromatic terminal end-group and exhibits a glass transition temperature (Tg) of <25° C. In some aspects of these embodiments, the liquid rubber exhibits a glass transition temperature (Tg) of ≦10° C. In some aspects of these embodiments, the liquid rubber exhibits a glass transition temperature of ≦0° C. In some aspects of these embodiments, the liquid rubber exhibits a glass transition temperature of ≦−10° C. In some aspects of these embodiments, the liquid rubber exhibits a glass transition temperature of ≦−15° C. In some aspects of these embodiments, the liquid rubber exhibits a glass transition temperature of ≦−20° C. In some aspects of these embodiments, the liquid rubber exhibits a glass transition temperature of ≦−25° C. In some aspects of these embodiments, the liquid rubber exhibits a glass transition temperature of ≦−30° C. In some aspects of these embodiments, the liquid rubber exhibits a glass transition temperature of ≦−35° C. In some aspects of these embodiments, the liquid rubber exhibits a glass transition temperature of ≦−40° C.

In some aspects of these embodiments, the liquid rubber comprises ≧35 wt % polymer chains having at least one non-functional aromatic terminal end-group. In some aspects of these embodiments, the liquid rubber comprises ≧40 wt % polymer chains having at least one non-functional aromatic terminal end-group. In some aspects of these embodiments, the liquid rubber comprises ≧50 wt % polymer chains having at least one non-functional aromatic terminal end-group. In some aspects of these embodiments, the liquid rubber comprises ≧60 wt % polymer chains having at least one non-functional aromatic terminal end-group. In some aspects of these embodiments, the liquid rubber comprises ≧70 wt % polymer chains having at least one non-functional aromatic terminal end-group. In some aspects of these embodiments, the liquid rubber comprises ≧75 wt % polymer chains having at least one non-functional aromatic terminal end-group. In some aspects of these embodiments, the liquid rubber comprises ≧80 wt % polymer chains having at least one non-functional aromatic terminal end-group.

In some embodiments of the present invention, non-functional aromatic terminal end-groups are provided during a polymerization process to prepare the liquid rubber. In some aspects of these embodiments, a variety of polymerization processes can be employed including, for example, free-radical polymerization and anionic polymerization. In some aspects of these embodiments, the polymerization to form the liquid rubber is initiated with one or more types of monomers for making the polymer chains with an aromatic-containing initiator in which a non-functional aromatic fragment of the initiator molecule resides at one or more polymer chain ends. In some aspects of these embodiments, non-functional aromatic terminal end-groups are incorporated into the liquid rubber via chain transfer and/or chain termination. A number of aromatic chain transfer agents and chain termination agents are known, such as those reported in The Polymer Handbook, 3rd. Ed., Edited by Brandrup and Immergut, John Wiley Publishers, New York, 1989.

In some embodiments of the present invention, the liquid rubber is prepared using solution polymerization techniques. In some aspects of these embodiments, non-functional aromatic terminal end-groups are incorporated into the liquid rubber through the use of aromatic-containing reaction solvents to facilitate chain transfer to solvent. In some aspects of these embodiments, the aromatic-containing reaction solvent is selected from any aromatic solvent that is liquid at the polymerization temperature and pressure used to prepare the liquid rubber and combinations thereof. In some aspects of these embodiments, the aromatic-containing reaction solvent is selected from benzene; naphthylene; n-alkyl benzenes (e.g., isopropyl benzene, ethyl benzene, toluene); n-alkyl naphthylenes (e.g., isopropyl naphthylene); and combinations thereof.

In some embodiments of the present invention, the aromatic-containing reaction solvent comprises a mineral oil. In some aspects of these embodiments, the aromatic-containing reaction solvent comprises one or more non-aromatic co-solvents blended with an aromatic-containing reaction solvent. In some aspects of these embodiments, the aromatic-containing reaction mixture comprises two or more aromatic-containing solvents blended together. Is some aspects of these embodiments, the aromatic-containing reaction solvent comprises a blend of a mixture of two or more aromatic-containing solvents and one or more non-aromatic containing solvents. In some aspects of these embodiments, the aromatic-containing reaction solvent comprises ≧20 wt % aromatic solvents. In some aspects of these embodiments, the aromatic-containing reaction solvent comprises ≧40 wt % aromatic solvents. In some aspects of these embodiments, the aromatic-containing reaction solvent comprises ≧60 wt % aromatic solvents. In some aspects of these embodiments, the aromatic-containing reaction solvent comprises ≧80 wt % aromatic solvents. In some aspects of these embodiments, wherein the chain transfer coefficient of the aromatic solvents is much greater than that of the non-aromatic solvents, the weigh percentage of the aromatic solvents in the aromatic-containing reaction solvent can be less than 20 wt %.

In some embodiments of the present invention, the liquid rubber is prepared using free-radical chain polymerization in aromatic-containing solvent at conditions of high pressure and high temperature conducive for preparing flexible polymers having weight average molecular weights up to 20,000 g/mol and at least one non-functional aromatic terminal end-group.

In some embodiments of the present invention, the liquid rubber comprises polymer chains having more than one non-functional aromatic terminal end-group. In some aspects of these embodiments, liquid rubber comprising polymer chains having two non-functional aromatic terminal end-groups are provided by using an aromatic-containing free radical initiator during the polymerization reaction to form the liquid rubber in the presence of an aromatic solvent. In some aspects of these embodiments, some or all of the polymer chains are both initiated and terminated with an aromatic-containing molecule.

In some embodiments of the present invention, the liquid rubber comprises polymer chains that have at least one non-functional aromatic end-group. In some aspects of these embodiments, the polymer chains comprise linear chains having two ends, wherein both ends comprise non-functional aromatic end-groups.

In some embodiments of the present invention, the liquid rubber comprises polymer chains that exhibit an advanced polymeric architecture. In some aspects of these embodiments, the advanced polymeric architecture is selected from graft copolymer architecture, block copolymer architecture, comb polymer architecture, star polymer architecture, starburst polymer architecture, and combinations thereof. In some aspects of these embodiments, all of the chain ends contain non-functional aromatic end-groups.

In some embodiments of the present invention, the liquid rubber further comprises other polymer chains that do not have at least one non-functional aromatic end-group. In some aspects of these embodiments, the overall average number of non-functional aromatic end-groups per polymer chain in the liquid rubber is $\geq 0.2$. In some aspects of these embodiments, the overall average number of non-functional aromatic end-groups per polymer chain in the liquid rubber is $\geq 0.4$. In some aspects of these embodiments, the overall average number of non-functional aromatic end-groups per polymer chain in the liquid rubber is $\geq 0.5$. In some aspects of these embodiments, the overall average number of non-functional aromatic end-groups per polymer chain in the liquid rubber is $\geq 0.7$. In some aspects of these embodiments, the overall average number of non-functional aromatic end-groups per polymer chain in the liquid rubber is $\geq 0.75$. In some aspects of these embodiments, the overall average number of non-functional aromatic end-groups per polymer chain in the liquid rubber is $\geq 1$. In some aspects of these embodiments, the overall average number of non-functional aromatic end-groups per polymer chain in the liquid rubber is $\geq 1.25$. In some aspects of these embodiments, the overall average number of non-functional aromatic end-groups per polymer chain in the liquid rubber is $\geq 1.5$. In some aspects of these embodiments, the overall average number of non-functional aromatic end-groups per polymer chain in the liquid rubber is $\geq 1.75$. In some aspects of these embodiments, the overall average number of non-functional aromatic end-groups per polymer chain in the liquid rubber is $\geq 2.0$. In some aspects of these embodiments, the overall average number of non-functional aromatic end-groups per polymer chain in the liquid rubber is 0.1 to 2. In some aspects of these embodiments, the overall average number of non-functional aromatic end-groups per polymer chain in the liquid rubber is 0.1 to 1.

In some embodiments of the present invention, the liquid rubber comprises polymer chains having at least one non-functional aromatic end-groups. In some aspects of these embodiments, 1 to 20 wt % of the liquid rubber is attributable to the non-functional aromatic end-groups. In some aspects of these embodiments, 5 to 15 wt % of the liquid rubber is attributable to the non-functional aromatic end-groups. In some aspects of these embodiments, 7 to 12 wt % of the liquid rubber is attributable to the non-functional aromatic end-groups.

In some embodiments of the present invention, the liquid rubber is prepared using free radical polymerization techniques with an aromatic-containing free radical initiator. In some aspects of these embodiments, the aromatic-containing free radical initiator is selected from the class of aromatic-containing hydrocarbon initiators. In some aspects of these embodiments, the aromatic-containing hydrocarbon initiators contain primarily carbon and hydrogen atoms and at least one aromatic group. In some aspects of these embodiments, the aromatic-containing hydrocarbon initiators are selected from various alkyl-substituted diphenyl compounds having the following general structure:

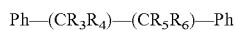

Ph—(CR$_3$R$_4$)—(CR$_5$R$_6$)—Ph wherein Ph is a phenyl group or a substituted phenyl group; and each of R$_3$, R$_4$, R$_5$ and R$_6$ represent hydrogen or an alkyl group. In some aspects of these embodiments, at least two of R$_3$, R$_4$, R$_5$ and R$_6$ are alkyl groups, and the phenyl groups are unsubstituted or contain alkyl substituents. In some aspects of these embodiments, the aromatic-containing hydrocarbon initiator is selected from 3,4-dimethyl-3,4-diphenylhexane; 2,3-dimethyl-2,3-diphenylbutane; and combinations thereof. In some aspects of these embodiments, the aromatic-containing hydrocarbon initiator is 3,4-dimethyl-3,4-diphenylhexane. In some aspects of these embodiments, the aromatic-containing hydrocarbon initiator is 2,3-dimethyl-2,3-diphenylbutane.

In some embodiments of the present invention, the liquid rubber is prepared using free radical polymerization techniques with an aromatic-containing free radical initiator. In some aspects of these embodiments, the aromatic-containing free radical initiator is selected from the class of di-aromatic hydrocarbon initiators such as oil-soluble di-aromatic-peroxide initiators. In some aspects of these embodiments, the aromatic-containing free radical initiator is selected from dicumyl peroxide, dibenzyl peroxydicarbonate and 2,4-dichlorobenzoyl peroxide.

In some embodiments of the present invention, the liquid rubber is prepared using free radical polymerization techniques with an aromatic-containing free radical initiator. In some aspects of these embodiments, the aromatic-containing free radical initiator is selected from various haloalkyl-substituted-, and alkyl-substituted diaryl compounds having the following general structure:

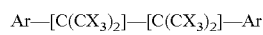

Ar—[C(CX$_3$)$_2$]—[C(CX$_3$)$_2$]—Ar wherein each Ar represents an aryl group or a substituted aryl group; and each occurrence of X represents a halogen atom or a hydrogen atom. In some aspects of these embodiments, the halogen atoms are selected from fluorine, bromine and iodine. In some aspects of these embodiments, the halogen atoms are chlorine. In some aspects of these embodiments, the aromatic-containing free radical initiator contains up to 12 halogen atoms or hydrogen atoms. In some aspects of these embodiments, the aromatic-containing free radical initiator contains 1 to 5 halogen atoms per molecule. In some aspects of these embodiments, at least one of the Ar's is a substituted aryl group. In some aspects of these embodiments, at least one of the Ar's is a substituted aryl group selected from phenyl, biphenyl, naphthyl, bihenyl and anthracenyl.

In some embodiments of the present invention, the liquid rubber is prepared using anionic polymerization techniques. In some aspects of these embodiments, the anionic polymerization to form the liquid rubber is initiated with an aromatic-containing Group I metal initiator such as phenyllithium. Control of the molecular weight of the liquid rubber and incorporation of non-functional aromatic chain ends is readily controlled through methods known in the anionic polymerization art.

In some embodiments of the present invention, chain termination is theoretically non-existent during anionic polymerization. In some aspects of these embodiments, aromatic-containing terminating agents, such as phenol, are used to terminate the living anionic polymer chain ends, with an aromatic group. In some aspects of these embodiments, molecular weight of the liquid rubber is readily controlled using anionic techniques as the molecular weight is determined by the ratio of the weight of polymerized monomer to the number of moles of initiator used.

In some embodiments of the present invention, the non-functional aromatic end-groups can be provided in the liquid rubber by post-reaction of the flexible polymer chains with an aromatic-containing molecule. In some aspects of these embodiments, the free radical chain polymerization of ethylenically unsaturated monomer leaves terminating chain end unsaturation. Subsequent reaction of an aromatic-containing molecule that reacts with the unsaturated chain end results in the polymer chain having an non-functional aromatic end-group.

In some embodiments of the present invention, to maximize polymer chain flexibility in the liquid rubber the weight fraction of low Tg monomer units of the polymer chains is maximized. In some aspects of these embodiments, low Tg monomers comprise $\geq 20$ wt % of the polymerized units of the liquid rubber polymer chains. In some aspects of these embodiments, low Tg monomers comprise $\geq 40$ wt % of the polymerized units of the liquid rubber polymer chains. In some aspects of these embodiments, low Tg monomers comprise $\geq 60$ wt % of the polymerized units of the liquid rubber polymer chains. In some aspects of these embodiments, low Tg monomers comprise $\geq 80$ wt % of the polymerized units of the liquid rubber polymer chains. In some aspects of these embodiments, the balance of the flexible polymer chains compose various co-monomers, initiator fragments, chain transfer agents, solvent fragments, functional terminal groups, non-functional terminal groups, coupling agents, crosslinkers and other polymeric chain fragments (e.g., polymer chains having a glass transition temperature of at least 25° C.).

In some embodiments of the present invention, the low Tg monomers are selected from $C_1$ to $C_{20}$ alkyl acrylate monomers (e.g., butyl acrylate, ethyl acrylate, n-octyl acrylate and 2-ethylhexyl acrylate); diene monomers (e.g., butadiene and isoprene); siloxane monomers (e.g., dimethylsiloxane); vinyl acetate monomers; and combinations thereof. In some aspects of these embodiments, the low Tg monomers are selected from $C_1$ to $C_8$ alkyl acrylates.

In some embodiments of the present invention, the liquid rubber comprises $\leq 80$ wt % of $C_1$ to $C_{20}$ alkyl acrylate monomer derived units. In some aspects of these embodiments, the liquid rubber comprises $\leq 75$ wt % $C_1$ to $C_{20}$ alkyl acrylate monomer derived units. In some aspects of these embodiments, the liquid rubber comprises $\leq 60$ wt % $C_1$ to $C_{20}$ alkyl acrylate monomer derived units. In some aspects of these embodiments, the liquid rubber comprises $\leq 50$ wt % $C_1$ to $C_{20}$ alkyl acrylate monomer derived units. In some aspects of these embodiments, the liquid rubber comprises $\leq 40$ wt % $C_1$ to $C_{20}$ alkyl acrylate monomer derived units. In some aspects of these embodiments, the liquid rubber comprises >0.01 wt % $C_1$ to $C_{20}$ alkyl acrylate monomer derived units. In some aspects of these embodiments, the liquid rubber comprises 0.1 to 80 wt % $C_1$ to $C_{20}$ alkyl acrylate monomer derived units.

In some embodiments of the present invention, the liquid rubber comprises various co-monomer derived units. In some aspects of these embodiments, the co-monomer derived units are derived from monomers selected from (meth)acrylic acids; (meth)acrylonitriles; (meth)acrylamides; 2-perfluoroalkylethyl(meth)acrylates; 2-(perhaloalkyl)ethyl (meth)acrylates; $C_1$ to $C_{20}$ alkyl(meth)acrylates; alkyl(ethyleneoxy)$_n$ (meth)acrylates; amino(meth)acrylates; aryl(meth)acrylates including multiple rings and substituted rings; conjugated dienes; silanes; siloxanes; vinyl aromatics, including multiple rings and substituted rings; vinyl benzoic acids; vinyl esters; vinyl ethers; vinyl halides; vinyl phosphoric acids; vinyl sulfonic acids; vinylic anhydrides; vinylidene halides; fluorophenyl(meth)acrylates; vinyltrimethylsilanes; and combinations thereof.

In some embodiments of the present invention, the liquid rubber comprises various co-monomer derived units. In some aspects of these embodiments, the co-monomer derived units are derived from monomers selected from vinyl aromatic monomers (e.g., styrene); alkyl methacrylic monomers (e.g., methyl methacrylate); acrylonitrile monomers; and combinations thereof.

In some embodiments of the present invention, the liquid rubber comprises methyl methacrylate co-monomer derived units.

In some embodiments of the present invention, the liquid rubber comprises at least one polymer chain having at least one vinyl end-group. In some aspects of these embodiments, at least one of the at least one vinyl end-group is saturated.

In some embodiments of the present invention, the liquid rubber further comprises polymerized units capable of crosslinking. In some aspects of these embodiments, the liquid rubber optionally comprises 0.1 to 20 wt % of polymerized units capable of crosslinking, based on total weight of polymer in the liquid rubber. In some aspects of these embodiments, the liquid rubber optionally comprises 0.1 to 15 wt % of polymerized units capable of crosslinking, based on total weight of polymer in the liquid rubber. In some aspects of these embodiments, the liquid rubber optionally comprises 0.5 to 10 wt % of polymerized units capable of crosslinking, based on total weight of polymer in the liquid rubber. In some aspects of these embodiments, the liquid rubber optionally comprises 2 to 10 wt % of polymerized units capable of crosslinking, based on total weight of polymer in the liquid rubber. In some aspects of these embodiments, the liquid rubber optionally comprises 1 to 7.5 wt % of polymerized units capable of crosslinking, based on total weight of polymer in the liquid rubber. In some aspects of these embodiments, the liquid rubber optionally comprises alternatively 2 to 6 wt % of polymerized units capable of crosslinking, based on total weight of polymer in the liquid rubber. In some aspects of these embodiments, the polymerized units capable of crosslinking are incorporated into the liquid rubber polymer chains between the ends. In some aspects of these embodiments, polymerized units capable of crosslinking incorporated into the liquid rubber are derived from monomers selected from hydroxyethyl (meth)acrylate, 2-hydroxypropyl (meth)acrylate; glycidyl (meth)acrylate and combinations thereof. In some aspects of these embodiments, polymerized units capable of crosslinking incorporated into the liquid rubber are derived from monomers selected from alkoxysilane monomers. In some aspects of these embodiments, the alkoxysilane monomers are selected from 2-methacryloxyethyl-trimethoxysilane, 3-methacryloxypropyl-trimethoxysilane, 3-acryloxypropyl-trimethoxysilane, and combinations thereof.

In some embodiments of the present invention, the liquid rubber comprises polymer chains having an average weight average molecular weight of 1,069 to 20,000 g/mol. In some aspects of these embodiments, the liquid rubber comprises polymer chains having an average weight average molecular weight of 1,069 to 10,000 g/mol. In some aspects of these embodiments, the liquid rubber comprises polymer chains having an average weight average molecular weight of 1,069 to 5,000 g/mol. In some aspects of these embodiments, the liquid rubber comprises polymer chains having an average weight average molecular weight of 1,069 to 3,000 g/mol.

In some embodiments of the present invention, one of free radical polymerization and anionic polymerization are used to prepare the liquid rubber. In some aspects of these embodiments, a reaction mixture of at least one $C_1$ to $C_{20}$ alkyl acrylate monomer and at least one aromatic-containing initiator is charged into a reactor maintained at a reaction temperature of $\leqq 400°$ C. with a reaction residence time sufficient for polymer chains to form. In some aspects of these embodiments, the reaction residence time is $\leqq 1,000$ minutes. In some aspects of these embodiments, the reaction mixture comprises 1.0 to 99.999 wt % (based on total weight of reaction mixture) of $C_1$ to $C_{20}$ alkyl acrylate monomer(s). In some aspects of these embodiments, the reaction mixture comprises $\geqq 10$ wt % (based on total weight of reaction mixture) of $C_1$ to $C_{20}$ alkyl acrylate monomer(s). In some aspects of these embodiments, the reaction mixture comprises 0.001 to 99 wt % (based on total weight of reaction mixture) of aromatic-containing initiator(s). In some aspects of these embodiments, the reaction mixture comprises $\geqq 0.01$ wt % (based on total weight of reaction mixture) of a free radical aromatic-containing initiator(s). In some aspects of these embodiments, the reaction mixture comprises $\geqq 0.001$ wt % (based on total weight of reaction mixture) of an anionic aromatic-containing initiator(s). In some aspects of these embodiments, the reaction mixture further comprises a solvent. In some aspects of these embodiments, the reaction mixture further comprises an aromatic solvent. In some aspects of these embodiments, the reaction mixture comprises $\leqq 90$ wt % solvent.

In some embodiments of the present invention, there is provided a method for preparing a toughened thermoplastic polymer. In some aspects of these embodiments, the weight percentage of liquid rubber in the thermoplastic polymer is $\geqq 1.0$ wt %. In some aspects of these embodiments, the weight percentage of liquid rubber in the thermoplastic polymer is $\geqq 2.0$ wt %. In some aspects of these embodiments, the weight percentage of liquid rubber in the thermoplastic polymer is $\geqq 5.0$ wt %. In some aspects of these embodiments, the weight percentage of liquid rubber in the thermoplastic polymer is $\geqq 10$ wt %. In some aspects of these embodiments, the weight percentage of liquid rubber in the thermoplastic polymer is $\geqq 15$ wt %. In some aspects of these embodiments, the weight percentage of liquid rubber in the thermoplastic polymer is $\geqq 20$ wt %. In some aspects of these embodiments, the weight percentage of liquid rubber in the thermoplastic polymer is $\geqq 25$ wt %. In some aspects of these embodiments, the weight percentage of liquid rubber in the thermoplastic polymer is $\geqq 30$ wt %. In some aspects of these embodiments, the weight percentage of liquid rubber in the thermoplastic polymer is $\geqq 35$ wt %. In some aspects of these embodiments, the weight percentage of liquid rubber in the thermoplastic polymer is $\geqq 40$ wt %. In some aspects of these embodiments, the weight percentage of liquid rubber in the thermoplastic polymer is $\geqq 45$ wt %. In some aspects of these embodiments, the weight percentage of liquid rubber in the thermoplastic polymer is $\geqq 50$ wt %. In some aspects of these embodiments, the weight percentage of liquid rubber in the thermoplastic polymer is 0.1 to 25 wt %. In some aspects of these embodiments, the weight percentage of liquid rubber in the thermoplastic polymer is 0.1 to 20 wt %. In some aspects of these embodiments, the weight percentage of liquid rubber in the thermoplastic polymer is 0.1 to 15 wt %. In some aspects of these embodiments, the weight percentage of liquid rubber in the thermoplastic polymer is 0.1 to 10 wt %. In some aspects of these embodiments, the weight percentage of liquid rubber in the thermoplastic polymer is 0.1 to 5 wt %.

In some embodiments of the present invention, the thermoplastic polymer is selected from thermoplastic polyurethane, thermoplastic polyurea, thermoplastic polyimide, thermoplastic polyamide, thermoplastic polyamideimide, thermoplastic polyester (e.g., polyethylene terephthalate and polybutylene terephthalate), thermoplastic polycarbonate, thermoplastic polysulfone, thermoplastic polyketone, thermoplastic polyalkylenes (e.g., thermoplastic polyethylene and thermoplastic polypropylene), thermoplastic acrylonitrile-butadiene-styrene and combinations thereof.

In some embodiments of the present invention, the thermoplastic polymer is selected from PVC; homo- and co-polymers of PVC; chlorinated PVC; poly(ethylene vinyl alcohol); polyesters (e.g., polyethylene terephthalate and polybutylene terephthalate); polyamides (e.g. nylon); poly(ethylene oxide); acrylonitrile/butadiene/styrene polymers; polycarbonates; polyacetals (e.g., poly(vinyl butyral)); methacrylate/butadiene/styrene polymers; styrene/maleic anhydride polymers; styrene/maleimide polymers; poly(phenylened ether); polysulfones; copolymers of 2,6-dimethylphenol and 2,6-diphenyl phenol; and combinations thereof.

In some embodiments of the present invention, the thermoplastic polymer is a thermoplastic polyurethane. In some aspects of these embodiments, the thermoplastic polyurethane is selected from any known thermoplastic polyurethane material. In some aspects of these embodiments, the thermoplastic polyurethane comprises a hard segment, a chain extender and a soft segment. In some aspects of these embodiments, the hard segment comprises an aromatic diisocyanate, an aliphatic diisocyanate and combinations thereof. In some aspects of these embodiments, the chain extender comprises a diol, polyol, diamine and combinations thereof. In some aspects of these embodiments, the chain extender exhibits a weight average molecular weight of $\leqq 500$ daltons; alternatively $\leqq 400$ daltons; alternatively 60 to 400 daltons. In some aspects of these embodiments, the soft segment comprises a polyether-based diol, a polyester-based diol, $C_2$-$C_8$ alkyl-based diol and combinations thereof. In some aspects of these embodiments, the soft segment exhibits a weight average molecular weight of 500 to 5,000 daltons.

In some embodiments of the present invention, the hard segment comprises a diisocyanate compound selected from 1,4'-dicyclohexylmethane diisocyanate; 3-isocyanatomethyl-3,S,S-trimethylcyclohexyl isocyanate; cyclohexylene-1,4-diisocyanate; 2,4-toluene diisocyanate; 2,6-toluene diisocyanate; mixtures of 2,4-toluene diisocyanate with 2,6-toluene diisocyanate; 4,4'-methylenebis(phenyl isocyanate); 2,2-diphenylpropane-4,4'-diisocyanate; o-phenylene diisocyanate; m-phenylene diisocyanate; xylene diisocyanate; 1,4-naphthalene diisocyanate; 1,S-naphthalene diisocyanate; 4,4'-diphenyl diisocyanate; azobenzene-4,4'-diisocyanate; m- or 12-tetramethylxylene diisocyanate and 1-chlorobenzene-2,4-diisocyanate; 1,6-hexamethylene diisocyanate; 4,6'-xylylene diisocyanate, 2,2,4-(2,4,4-)trimethylhexamethylene diisocyanate; 3,3'-dimethyldiphenyl 4,4'-diisocyanate; 3,3'-dimethyl-diphenylmethane 4,4'-diisocyanate; and combinations thereof.

In some embodiments of the present invention, the chain extender comprises a material selected from a straight-chain aliphatic polyol, a diamine, an aromatic diol, an aromatic diamine, a triol and combinations thereof. In some aspects of these embodiments, the straight-chain aliphatic polyol is selected from 1,2-ethane diol; 1,2-propane diol; 1,3-propane diol; 1,2-butane diol; 1,4-butane diol; 1,4-pentane diol; 1,6-hexane diol; 1,4-cyclohexane diol; glycerine; hydro quinone diethylol ether; resorcinol ethylol ether; derivatives thereof and combinations thereof.

Examples of low molecular weight aromatic diamines include: 3,3'-dichloro-4,4'-diaminodiphenyl-methane; 4,4'-diaminodiphenylmethane; 1,4-diaminobenzene; 3,3'- dimethoxy-4,4'-diamino biphenyl; 3,3'-dimethyl-4,4'-diamino biphenyl; 4,4'-diamino biphenyl; 3,3'-dichloro-4,4'-diamino biphenyl; and combinations thereof.

In some embodiments of the present invention, the thermoplastic polymer is a thermoplastic polyester. In some aspects of these embodiments, the thermoplastic material is prepared from a combination of at least one dihydric alcohols and at least one dicarboxylic acid. In some aspects of these embodiments, the at least one dihydric alcohol is selected from 1,2-propylene glycol; 1,3-propylene glycol; 1,4-butanediol; 1,3-butanediol; 2-methylpentanediol; 1,5-diethylene glycol; 1,5-pentanediol; 1,6-pentanediol; 1,12-dodecanediol; derivatives thereof and combinations thereof. In some aspects of these embodiments, the at least one dicarboxylic acid is selected from adipic acid, succinic acid, sebacic acid, suberic acid, methyladipic acid, glutaric acid, pimelic acid, azelaic acid, thiodipropionic acid, citraconic acid, aromatic dicarboxylic acid, derivatives thereof and combinations thereof. In some aspects of these embodiments, the at least one dihydric alcohol is selected from $C_2$-$C_8$ alkyl diol and combinations thereof.

In some embodiments of the present invention, the thermoplastic polymer is a thermoplastic polyester. In some aspects of these embodiments, the thermoplastic polyester comprises at least one of a hydrocarboxylic acid, a lactone and a carbonate.

In some embodiments of the present invention, the thermoplastic polymer is a thermoplastic polyester. In some aspects of these embodiments, the thermoplastic polyester is derived from a diol selected from a $C_2$-$C_8$ alkyl-based diol, a polyether-based diol, a polyester-based diol, derivatives thereof and combinations thereof. In some aspects of these embodiments, the thermoplastic polyester comprises an admixture of a polyether diol-based polyester and a polyester diol-based polyester.

In some embodiments of the present invention, the composite material comprises 20 to 95 wt % thermoplastic material and 80 to 5 wt % liquid rubber. In some aspects of these embodiments, the composite material comprises 25 to 93 wt % thermoplastic material and 75 to 7 wt % thermoplastic material. In some aspects of these embodiments, the composite material comprises 30 to 90 wt % thermoplastic material and 70 to 10 wt % liquid rubber. In some aspects of these embodiments, the composite material comprises 30 to 85 wt % thermoplastic material and 70 to 15 wt % liquid rubber. In some aspects of these embodiments, the thermoplastic material comprises 30 to 80 wt % thermoplastic material and 70 to 20 wt % liquid rubber. In some aspects of these embodiments, the thermoplastic material comprises a thermoplastic polyester, wherein the thermoplastic polyester comprises an admixture of a polyether-based diol and a polyester-based diol. In some aspects of these embodiments, the composite material comprises 25 to 40 wt % polyether-based diol; 25 to 40 wt % polyester-based diol and 25 to 40 wt % liquid rubber.

In some embodiments of the present invention, the composite material further comprises an additive selected from antioxidants, fillers, pigments, lubricants, plasticizers, UV stabilizers, heat stabilizers, flame retardants, antistatic agents and combinations thereof.

In some embodiments of the present invention, the method for preparing a composite material, comprises: (a) providing a thermoplastic material in a liquid state; (b) providing a liquid rubber; (c) combining the liquid rubber with the thermoplastic material in the liquid state; and (d) transforming the thermoplastic material into a solid state; wherein the liquid rubber has a glass transition temperature of less than 25° C., a weight average molecular weight of $\geq 1{,}069$ g/mol and comprises polymer chains that have at one or more non-functional aromatic terminal end-group; wherein (a) comprises providing a liquid monomer; wherein (d) comprises polymerizing the liquid monomer to form a thermoplastic polymer; and wherein the liquid rubber is miscible in the liquid monomer and immiscible in the thermoplastic material in the solid state. In some aspects of these embodiments, the liquid monomer is selected from (meth)acrylic acid; $C_1$-$C_{20}$ (alkyl)acrylate; vinyl acetate; vinyl chloride; amides; imides; polyesters; polyurethanes; polyolefins; vinyl aromatics; butadiene; derivatives thereof and combinations thereof. In some aspects of these embodiments, the liquid monomer is selected from (meth)acrylic acid; $C_1$-$C_{20}$ (alkyl)acrylate; derivatives thereof and combinations thereof.

In some embodiments of the present invention, the method for preparing a composite material, comprises: (a) providing a thermoplastic material in a liquid state; (b) providing a liquid rubber; (c) combining the liquid rubber with the thermoplastic material in the liquid state; and (d) transforming the thermoplastic material into a solid state; wherein the liquid rubber has a glass transition temperature of less than 25° C., a weight average molecular weight of $\geq 1{,}069$ g/mol and comprises polymer chains that have at one or more non-functional aromatic terminal end-group; wherein (a) comprises providing a liquid oligomer; wherein (d) comprises polymerizing the liquid oligomer to form a thermoplastic polymer; and wherein the liquid rubber is miscible in the liquid oligomer and immiscible in the thermoplastic material in the solid state. In some aspects of the embodiments, the method further comprises processing the composite material by extruding, blow molding, injection molding, calendaring, thermoforming or pultruding.

In some embodiments of the present invention, the method for preparing a composite material, comprises: (a) providing a thermoplastic material in a liquid state; (b) providing a liquid rubber; (c) combining the liquid rubber with the thermoplastic material in the liquid state; and (d) transforming the thermoplastic material into a solid state; wherein the liquid rubber has a glass transition temperature of less than 25° C., a weight average molecular weight of $\geq 1{,}069$ g/mol and comprises polymer chains that have at one or more non-functional aromatic terminal end-group; wherein (a) comprises providing a liquid monomer and a liquid oligomer; wherein (d) comprises polymerizing the combination of the liquid monomer and liquid oligomer to form a thermoplastic polymer; and wherein the liquid rubber is miscible in the combination of liquid monomer and liquid oligomer, and immiscible in the thermoplastic material in the solid state. In some aspects of the embodiments, the method further comprises processing the composite material by extruding, blow molding, injection molding, calendaring, thermoforming or pultruding.

In some embodiments of the present invention, the method for preparing a composite material, comprises: (a) providing a thermoplastic material in a liquid state; (b) providing a liquid rubber; (c) combining the liquid rubber with the thermoplastic material in the liquid state; and (d) transforming the thermoplastic material into a solid state; wherein the liquid rubber has a glass transition temperature of less than 25° C., a weight average molecular weight of $\geq 1{,}069$ g/mol and comprises polymer chains that have at one or more non-functional aromatic terminal end-group; wherein (a) comprises providing a molten thermoplastic polymer; (d) comprises cooling the molten thermoplastic polymer; and wherein the liquid rubber is miscible in the molten thermoplastic polymer and immiscible in the thermoplastic material in the solid state. In some aspects of the embodiments, the method further comprises processing the composite material by extruding, blow molding, injection molding, calendaring, thermoforming or pultruding.

In some embodiments of the present invention, the method for preparing a composite material, comprises: (a) providing a thermoplastic material in a solid state; (b) providing a liquid rubber; (c) combining the liquid rubber with the thermoplastic material in a solid state; (d) transforming the thermoplastic material into a liquid state by melting the thermoplastic material to provide a molten thermoplastic polymer; and (e) transforming the thermoplastic material back to the solid state by cooling; wherein the liquid rubber has a glass transition temperature of less than 25° C., a weight average molecular weight of $\geq 1{,}069$ g/mol and comprises polymer chains that have at one or more non-functional aromatic terminal end-group; wherein the liquid rubber is miscible in the molten thermoplastic polymer and immiscible in the thermoplastic material in the solid state. In some aspects of the embodiments, the method further comprises processing the composite material by extruding, blow molding, injection molding, calendaring, thermoforming or pultruding.

In some embodiments of the present invention, the method for improving toughness of a thermoplastic polymer, comprising: providing a combination of a thermoplastic material and a liquid rubber; wherein the liquid rubber has a glass transition temperature of less than 25° C., a weight average molecular weight of $\geq 1{,}069$ g/mol and comprises polymer chains that have at one or more non-functional aromatic terminal end-group; wherein the liquid rubber is miscible in the thermoplastic material in a liquid state and immiscible in the thermoplastic material in a solid state and wherein the toughness of the combined thermoplastic polymer and liquid rubber is greater than the toughness of the thermoplastic polymer in the absence of the liquid rubber.

In some embodiments of the present invention, the method for improving toughness of a thermoplastic polymer, comprises: (a) providing a thermoplastic material in a liquid state; (b) providing a liquid rubber; (c) combining the liquid rubber with the thermoplastic material in the liquid state; and (d) transforming the thermoplastic material into a solid state; wherein the liquid rubber has a glass transition temperature of less than 25° C., a weight average molecular weight of $\geq 1{,}069$ g/mol and comprises polymer chains that have at one or more non-functional aromatic terminal end-group; wherein (a) comprises providing a liquid monomer; wherein (d) comprises polymerizing the liquid monomer to form a thermoplastic polymer; and wherein the liquid rubber is miscible in the liquid monomer and immiscible in the thermoplastic material in the solid state. In some aspects of the embodiments, the method further comprises processing the composite material by extruding, blow molding, injection molding, calendaring, thermoforming or pultruding.

In some embodiments of the present invention, the method for improving the toughness of a thermoplastic polymer, comprises: (a) providing a thermoplastic material in a liquid state; (b) providing a liquid rubber; (c) combining the liquid rubber with the thermoplastic material in the liquid state; and (d) transforming the thermoplastic material into a solid state; wherein the liquid rubber has a glass transition temperature of less than 25° C., a weight average molecular weight of $\geq 1{,}069$ g/mol and comprises polymer chains that have at one or more non-functional aromatic terminal end-group; wherein (a) comprises providing a liquid oligomer; wherein (d) comprises polymerizing the liquid oligomer to form a thermoplastic polymer; and wherein the liquid rubber is miscible in the liquid oligomer and immiscible in the thermoplastic material in the solid state. In some aspects of the embodiments, the method further comprises processing the composite material by extruding, blow molding, injection molding, calendaring, thermoforming or pultruding.

In some embodiments of the present invention, the method for improving the toughness of a thermoplastic polymer, comprises: (a) providing a thermoplastic material in a liquid state; (b) providing a liquid rubber; (c) combining the liquid rubber with the thermoplastic material in the liquid state; and (d) transforming the thermoplastic material into a solid state; wherein the liquid rubber has a glass transition temperature of less than 25° C., a weight average molecular weight of $\geq 1{,}069$ g/mol and comprises polymer chains that have at one or more non-functional aromatic terminal end-group; wherein (a) comprises providing a liquid monomer and a liquid oligomer; wherein (d) comprises polymerizing the combination of the liquid monomer and liquid oligomer to form a thermoplastic polymer; and wherein the liquid rubber is miscible in the combination of liquid monomer and liquid oligomer, and immiscible in the thermoplastic material in the solid state. In some aspects of the embodiments, the method further comprises processing the composite material by extruding, blow molding, injection molding, calendaring, thermoforming or pultruding.

In some embodiments of the present invention, the method for improving the toughness of a thermoplastic polymer, comprises: (a) providing a thermoplastic material in a liquid state; (b) providing a liquid rubber; (c) combining the liquid rubber with the thermoplastic material in the liquid state; and (d) transforming the thermoplastic material into a solid state; wherein the liquid rubber has a glass transition temperature of less than 25° C., a weight average molecular weight of $\geq 1{,}069$ g/mol and comprises polymer chains that have at one or more non-functional aromatic terminal end-group; wherein (a) comprises providing a molten thermoplastic polymer; (d) comprises cooling the molten thermoplastic polymer; and wherein the liquid rubber is miscible in the molten thermoplastic polymer and immiscible in the thermoplastic material in the solid state. In some aspects of the embodiments, the method further comprises processing the composite material by extruding, blow molding, injection molding, calendaring, thermoforming or pultruding.

In some embodiments of the present invention, the method for improving the toughness of a thermoplastic polymer, comprises: (a) providing a thermoplastic material in a solid state; (b) providing a liquid rubber; (c) combining the liquid rubber with the thermoplastic material in a solid state; (d) transforming the thermoplastic material into a liquid state by melting the thermoplastic material to provide a molten thermoplastic polymer; and (e) transforming the thermoplastic material back to the solid state by cooling; wherein the liquid rubber has a glass transition temperature of less than 25° C., a weight average molecular weight of $\geq 1{,}069$ g/mol and comprises polymer chains that have at one or more non-functional aromatic terminal end-group; wherein the liquid rubber is miscible in the molten thermoplastic polymer and immiscible in the thermoplastic material in the solid state. In some aspects of the embodiments, the method further comprises processing the composite material by extruding, blow molding, injection molding, calendaring, thermoforming or pultruding.

In some embodiments of the present invention, the method of improving the toughness of a thermoplastic material provides an increase in toughness of the thermoplastic material. In some aspects of these embodiments, the addition of the liquid rubber provides a $\geq 5\%$ improvement in the toughness of the thermoplastic material. In some aspects of these embodiments, the addition of the liquid rubber provides a ≧25% improvement in the toughness of the thermoplastic material. In some aspects of these embodiments, the addition of the liquid rubber provides a ≧50% improvement in the toughness of the thermoplastic material. In some aspects of these embodiments, the addition of the liquid rubber provides a ≧75% improvement in the toughness of the thermoplastic material. In some aspects of these embodiments, the addition of the liquid rubber provides a ≧100% improvement in the toughness of the thermoplastic material. In some aspects of these embodiments, toughness is determined by measurement according to standard test method ASTM D 256-06. In some aspects of these embodiments, toughness is determined by measurement according to standard test method ASTM D 5045-99.

In some embodiments of the present invention, the composite material is used in, for example, packaging materials, auto parts, food trays, cell phone housings, and housings for electronic equipment.

Some embodiments of the present invention will now be described in detail in the following Examples. All fractions and percentages set forth below in the Examples are by weight unless otherwise specified.

EXAMPLE 1

Preparation of Liquid Rubber

A Liquid Rubber was prepared by free radical polymerization in a continuous flow stirred tank reactor (CFSTR) as follows. A monomer mixture was prepared from n-butyl acrylate (BA), methyl methacrylate (MMA), and glycidyl methacrylate (GMA) in a weight ratio of 90:5:5. Di-tertiary butyl peroxide (DTBP, 4 weight percent based on the total weight of the monomer) and a solvent/chain transfer agent (xylene, 20 weight percent based on the total weight of monomer charged) was added to the mixture in a glass vessel. The mixture was purged with an inert gas, nitrogen, then degassed and stored under a nitrogen blanket. The reactor was set at an external pressure, via the grove valve, of 125 psi and a constant temperature of 200° C. Within a few seconds of the temperature becoming stable, the monomer mixture was introduced continuously into the reactor through a high capacity pump (flow rate=60 grams/minute). The entire mixture was agitated at 300 rpm. The mixture was polymerized within 10 minutes, resulting in a 92-95 weight percent monomer conversion. The residual monomer and solvent was removed by vacuum devolatilization to yield the finished product, p(BA/MMA/GMA) having a weight ratio of 90/5/5.

NMR spectroscopy indicated the product comprised approximately 0.72 moles of terminal units derived from BA, 30.75 moles of internal units derived from BA, 1.30 moles of internal units derived from GMA, 1.30 moles of terminal units derived from toluene, and 1.65 moles of units derived from methyl methacrylate. NMR spectroscopy also indicated that benzyl groups (derived from xylene) were incorporated into the polymer chain. No initiator fragments were detected in the polymer chain.

EXAMPLE 2

Preparation of Liquid Rubber

A Liquid Rubber was prepared by free radical polymerization in a continuous flow stirred tank reactor (CFSTR) as follows. A monomer mixture was prepared containing BA (200.2 grams), MMA (200.2 grams), GMA (22.23 grams), and DTPB (4% based on the weight of monomer, 16.90 grams). This mixture plus solvent/chain transfer agent (xylene, 181.13 grams, 30 weight percent of the total reaction mixture) was fed into a glass vessel in which the mixture was degassed and stored under an inert atmosphere (nitrogen). The reactor pressure was set externally, via the grove valve, at 125 psi. The mixture was purged with an inert gas, nitrogen, then degassed and stored under a nitrogen blanket. Within a few seconds of the reactor set temperature of 200 C becoming stable, the monomer mixture was introduced continuously into the reactor through a high capacity pump (flow rate=60 grams/minute). The entire mixture was agitated at 300 rpm during the reaction. The mixture was polymerized within 10 minutes, resulting in a 92-95 weight percent monomer conversion. The residual monomer and solvent was removed by vacuum devolatilization to yield the finished product, a polymer, p(BA/MMA/GMA) having a weight ratio of 47.5/47.5/5.

NMR spectroscopy indicated the product comprised approximately 1.15 moles of terminal units derived from BA, 7.57 moles of internal units derived from BA, 0.65 moles of internal units derived from GMA, 0.53 moles derived from xylene, and 5.68 moles of internal units derived from methyl methacrylate. Terminal units derived from methyl methacrylate were also present. NMR spectroscopy also indicated that benzyl groups (derived from xylene) were incorporated into the polymer chain. Also the methyl methacrylate units are incorporated in the polymer, in the form of dimers of methyl methacrylate. No initiator fragments were detected in the polymer chain.

EXAMPLE 3

Preparation of Liquid Rubber

A Liquid Rubber was prepared using a continuous flow reaction in accordance with the procedures set forth in U.S. 2003/0022992 A1. The monomers (BA, MMA, and GMA), initiator (3,4-dimethyl-3,4-diphenylbutane, typically 4 percent by weight of monomer), and solvent (xylene, 20% by weight of the total reaction mixture) were mixed and fed into a glass vessel that was purged with nitrogen. After purging, the mixture was degassed and kept under a nitrogen blanket. The mixture was then pumped at a rate of 12 g/minute through a series of filters into a 600-mL CFSTR in which the monomers were copolymerized to yield the liquid rubber polymer product. The reaction conditions were as follows: Temperature: 260-300; Pressure: 300-800 psi; Reactant Flow Rate: 10-15 g/min.; Residence Time in Reactor: 40-60 minutes. Monomer to polymer conversion was typically 92-95 weight percent. Residual monomer and solvent were removed by vacuum devolatilization to yield p(BA/MMA/GMA) having a weight ratio of 80.8/14.2/5.

EXAMPLE 4

Preparation of Liquid Rubber

A Liquid Rubber was made by the procedures set forth for Liquid Rubber D, with the exception that xylene was used as the solvent in an amount of 20 percent by weight of the total reaction mixture, to yield p(BA/MMA/GMA) having a weight ratio of 47.5/47.5/5.

COMPARATIVE EXAMPLE 5

Thermoplastic Material w/o Liquid Rubber 200 grams of a polylactide polymer (Commercially available from Nature Works LLC as PLA 2002D) was processed on a Collin Electrically heated two roll mill at 175° C. for 5 minutes. The resulting material was then pressed into a ⅛ inch plaque at 180° C. for 5 minutes. The plaque was cooled at room temperature for 4.5 minutes before solid panels were removed and test pieces were cut for evaluation in accordance with ASTM standard test procedures. The physical and mechanical properties of the neat resin panels are provided in Table 1.

EXAMPLE 6

Preparation of Composite Material 180 grams of a polylactide polymer (PLA 2002D) was combined with 20 grams of Liquid Rubber prepared according to Example 1. The combination was melt blended on a Collin Electrically heated two roll mill at 175° C. for 5 minutes. At the end of this period, the blend is pressed in a ⅛ inch plaque at 180 C for 5 minutes. The plaque was cooled at room temperature for 4.5 minutes before solid panels were removed and test pieces were cut for evaluation in accordance with ASTM standard test procedures. The physical and mechanical properties of the neat resin panels are provided in Table 1.

EXAMPLE 7

Preparation of Composite Material 170 grams of a polylactide polymer (PLA 2002D) was combined with 30 grams of Liquid Rubber prepared according to Example 1. The combination was melt blended on a Collin Electrically heated two roll mill at 175° C. for 5 minutes. At the end of this period, the blend is pressed in a ⅛ inch plaque at 180 C for 5 minutes. The plaque was cooled at room temperature for 4.5 minutes before solid panels were removed and test pieces were cut for evaluation in accordance with ASTM standard test procedures. The physical and mechanical properties of the neat resin panels are provided in Table 1.

COMPARATIVE EXAMPLE 8

Preparation of Composite Material 180 grams of a polylactide polymer (PLA 2002D) was combined with 20 grams of Liquid Rubber (47.5 BA/47.5 MMA/5 GMA). The combination was melt blended on a Collin Electrically heated two roll mill at 175° C. for 5 minutes. At the end of this period, the blend was pressed in a ⅛ inch plaque at 180 C for 5 minutes. The plaque was cooled at room temperature for 4.5 minutes before solid panels were removed and test pieces were cut for evaluation in accordance with ASTM standard test procedures. The plague was observed to be optically clear, indicating that the Liquid Rubber was miscible in the thermoplastic material in the solid state. The physical and mechanical properties of the neat resin panels are provided in Table 1.

COMPARATIVE EXAMPLE 9

Preparation of Composite Material 170 grams of a polylactide polymer (PLA 2002D) was combined with 30 grams of Liquid Rubber (47.5 BA/47.5 MMA/5 GMA). The combination was melt blended on a Collin Electrically heated two roll mill at 175° C. for 5 minutes. At the end of this period, the blend was pressed in a ⅛ inch plaque at 180 C for 5 minutes. The plaque was cooled at room temperature for 4.5 minutes before solid panels were removed and test pieces were cut for evaluation in accordance with ASTM standard test procedures. The plague was observed to be optically clear, indicating that the Liquid Rubber was miscible in the thermoplastic material in the solid state. The physical and mechanical properties of the neat resin panels are provided in Table 1.

TABLE 1

| Composite Material | Liquid Rubber in (wt %) | Izod$^\mathcal{F}$ in (ft.lbf/in) | Izod$^\kappa$ in (ft.lbf/in) |
| --- | --- | --- | --- |
| Comp. Ex. 5 | 0 | 0.45 | 0.42 |
| Ex. 6 | 10 | 1.1 | 0.89 |
| Ex. 7 | 15 | 1.04 | 0.82 |
| Comp. Ex. 8 | 10 | 0.47 | 0.42 |
| Comp. Ex. 9 | 15 | 0.44 | 0.41 |

$^\mathcal{F}$Measured at room temperature according to standard test method ASTM D 256-06.
$^\kappa$Measured at 0° C. according to standard test method ASTM D 256-06.

COMPARATIVE EXAMPLE 10

Non-Liquid Rubber Containing Thermoplastic Material

In each experiment, 2,000 grams of an oven dried PMMA resin (available from Elf Ato Chem as V-826-100 with a refractive index of 1.49) was injection molded with a molding temperature of 200-234° C. Test pieces were prepared from the injection molded product for analyses according to ASTM standards. The results of these analyses are provided in Table 2.

COMPARATIVE EXAMPLE 11

Non-Liquid Rubber Containing Thermoplastic Material

A resin mixture comprising MMA monomer, 0.19 wt % (based on weight of monomer) of a non-foaming nitrile catalyst (2,2'-Azobis(isobutyronitrile) AIBN commercially available from Akzo Nobel) and 0.06 wt % (based on weight of monomer) of a peroxide initiator (t-butyl peroxy-acetate commercially available from Elf Atochem as Lupersol 70) and 0.1 wt % (based on weight of monomer) chain transfer agent (n-DDM) was prepared according to the following procedure.

The MMA monomer (1,000 grams) was charged to a resin kettle and sparged for 15 minutes with dry nitrogen. At the end of the 15 minute period, the contents of the resin kettle were placed under vacuum (635 mm Hg) and degassed for 15 minutes. The chain transfer agent was then added to the resin kettle followed by vigorous mixing to yield a uniform mixture. The catalyst and initiator were then added to the contents of the resin kettle. Following this addition, the contents of the resin kettle were degassed for 15 minutes to remove any entrained gas bubbles resulting from the mixing process. Prior to curing of the liquid mixture, a closed aluminum metal mold was evacuated down to a pressure of 635 mm Hg. The degassed contents of the resin kettle were then injected into the mold with the aid of a 50 psi back pressure. After filling, the mold was placed in a vertical position for the duration of the curing cycle. The resin was subsequently cured by placing the mold in a forced air oven that was previously heated to 65° C. The resin was allowed to cure at this temperature for a minimum of 17 hours. At the end of this first cycle the oven temperature was raised to 120° C. and the curing continued for another 1 hour in the forced air oven. The latter portion of the heating cycle was deemed a post curing portion of the sheet casting operation. After curing, the mold was allowed to cool to ambient temperature before the solid panels were removed and test pieces were prepared for fracture toughness analysis according to ASTM standard D5045. The results are provided in Table 2.

EXAMPLE 12-14

Preparation of Composite Material

A resin mixture comprising MMA monomer, a Liquid Rubber prepared according to Example 1, 0.19 wt % (based on weight of monomer) of a non-foaming nitrile catalyst (2,2'-Azobis(isobutyronitrile) AIBN commercially available from Akzo Nobel) and 0.06 wt % (based on weight of monomer) of a peroxide initiator (t-butyl peroxy-acetate commercially available from Elf Atochem as Lupersol 70) and 0.1 wt % (based on weight of monomer) chain transfer agent (n-DDM) was prepared according to the following procedure.

The MMA monomer and the Liquid Rubber in the amounts provided in Table 3 were charged to a resin kettle and sparged for 15 minutes with dry nitrogen. At the end of the 15 minute period, the contents of the resin kettle were placed under vacuum (635 mm Hg) and degassed for 15 minutes. The chain transfer agent was then added to the resin kettle followed by vigorous mixing to yield a uniform mixture. The catalyst and initiator were then added to the contents of the resin kettle. Following this addition, the contents of the resin kettle were degassed for 15 minutes to remove any entrained gas bubbles resulting from the mixing process. Prior to curing of the liquid mixture, a closed aluminum metal mold was evacuated down to a pressure of 635 mm Hg. The degassed contents of the resin kettle were then injected into the mold with the aid of a 50 psi back pressure. After filling, the mold was placed in a vertical position for the duration of the curing cycle. The resin was subsequently cured by placing the mold in a forced air oven that was previously heated to 65° C. The resin was allowed to cure at this temperature for a minimum of 17 hours. At the end of this first cycle the oven temperature was raised to 120° C. and the curing continued for another 1 hour in the forced air oven. The latter portion of the heating cycle was deemed a post curing portion of the sheet casting operation. After curing, the mold was allowed to cool to ambient temperature before the solid panels were removed and test pieces were prepared for fracture toughness analysis according to ASTM standard D5045. The results are provided in Table 2.

TABLE 2

| Property | Ex. 10 | Ex. 11 | Ex. 12 | Ex. 13 | Ex. 14 |
|---|---|---|---|---|---|
| Fracture Toughness by Kic (in MPam$^{1/2}$) | 1.56 | 1.72 | 1.76 | 2.51 | 2.99 |
| Fracture Toughness by Gic (in J/m$^2$) | 507.17 | 662.86 | 758.77 | 2230.33 | 4974.96 |

TABLE 3

| Example # | MMA (in g) | Liquid Rubber (in g) |
|---|---|---|
| 12 | 950 | 50 |
| 13 | 900 | 100 |
| 14 | 850 | 150 |

We claim:
1. A composite material comprising:
a thermoplastic material; and,
a liquid rubber;
wherein the liquid rubber has a glass transition temperature of less than 25° C., a weight average molecular weight of ≧1,069 g/mol and comprises polymer chains that have one or more non functional aromatic terminal end-group; wherein the thermoplastic material is a thermoplastic polymer and wherein the liquid rubber is miscible with the thermoplastic material in a liquid state and immiscible with the thermoplastic material in a solid state.

2. The composite material of claim 1, wherein the composite material comprises 5 to 80 wt % liquid rubber.

3. The composite material of claim 1, further comprising an additive selected from an antioxidant, a filler, a pigment, a lubricant, a plasticizer, a UV stabilizer, a heat stabilizer, a flame retardant, an antistatic agent and a combination thereof.

4. A product comprising the composite material of claim 1, wherein the product is selected from packaging materials, auto parts, food trays, cell phone housings, and housings for electronic equipment.

5. A method far preparing a composite material, comprising:
(a) providing a thermoplastic material;
(b) providing a liquid rubber; and,
(c) combining the liquid rubber with the thermoplastic material;
wherein the liquid rubber has a glass transition temperature of less than 25° C., a weight average molecular weight of ≧1,069 g/mol and comprises polymer chains that have one or more non functional aromatic terminal end-group; wherein the liquid rubber is miscible in the thermoplastic material in a liquid state and immiscible in the thermoplastic material in a solid state.

6. The method of claim 5, further comprising processing the composite material by at least one of extruding, blow molding, injection molding, calendaring, thermoforming and pultruding.

7. The method of claim 5, wherein (a) providing a thermoplastic material, comprises providing a liquid monomer; wherein the method further comprises (d) transforming the thermoplastic material into a solid state by polymerizing the liquid monomer; and wherein the liquid rubber is miscible in the liquid monomer and immiscible in the thermoplastic material in the solid state.

8. The method of claim 5, wherein (a) providing a thermoplastic material, comprises providing a liquid oligomer; wherein the method further comprises (d) transforming the thermoplastic material into a solid state by polymerizing the liquid oligomer; and wherein the liquid rubber is miscible in the liquid oligomer and immiscible in the thermoplastic material in the solid state.

9. The method of claim 5, wherein (a) providing a thermoplastic material, comprises providing a molten thermoplastic polymer; wherein the method further comprises (d) transforming the thermoplastic material into a solid state by cooling the molten thermoplastic polymer; and wherein the liquid rubber is miscible in the molten thermoplastic polymer and immiscible in the thermoplastic material in the solid state.

10. A method for improving toughness of a thermoplastic material, comprising:

providing a combination of a thermoplastic material and a liquid rubber;

wherein the liquid rubber has a glass transition temperature of less than 25° C., a weight average molecular weight of $\geqq 1{,}069$ g/mol and comprises polymer chains that have one or more non functional aromatic terminal endgroup; wherein the liquid rubber is miscible in the thermoplastic material in a liquid state and immiscible in the thermoplastic material in a solid state and wherein the toughness of the combined thermoplastic material and liquid rubber is greater than the toughness of the thermoplastic material in the absence of the liquid rubber.

11. The composite of claim 1 wherein the polymer chains comprise one or more of $C_1$ to $C_{10}$ alkyl (meth)acrylates; (meth)acrylic acids; (meth)acrylonitriles; meth)acrylamides; 2-perfluoroalkylethyl (meth)acrylates; 2-(perhaloalkyl)ethyl (meth)acrylates; alkyl(ethyleneoxy)$_n$(meth)acrylates; amino (meth)acrylates; aryl(meth)acrylates; vinyl benzoic acids; vinyl esters; vinyl ethers; vinyl halides; vinyl phosphoric acids; vinyl sulfonic acids; vinylic anhydrides; vinylidene halides; fluorophenyl(meth)acrylates; vinyltrimethylsilanes; $C_2$ to $C_3$ hydroxyalkyl(meth)acrylates, glycidyl(meth)acrylates, alkoxysilanes; and combinations thereof.

12. The method of claim 5 wherein the polymer chains comprise one or more of $C_1$ to $C_{20}$ alkyl(meth)acrylates; (meth)acrylic acids; (meth)acrylonitriles; (meth)acrylamides; 2-perfluoroalkylethyl(meth)acrylates; 2-(perhaloalkyl)ethyl(meth)acrylates; alkyl(ethyleneoxy)$_n$(meth) acrylates; amino(meth)acrylates; aryl(meth)acrylates; vinyl benzoic acids; vinyl esters; vinyl ethers; vinyl halides; vinyl phosphoric acids; vinyl sulfonic acids; vinylic anhydrides; vinylidene halides; fluorophenyl(meth)acrylates; vinyltrimethylsilanes; $C_2$ to $C_3$ hydroxyalkyl(meth)acrylates, glycidyl (meth)acrylates, alkoxysilanes; and combinations thereof.

13. The method of claim 10 wherein the polymer chains comprise one or more of $C_1$ to $C_{20}$ alkyl(meth)acrylates; (meth)acrylic acids; (meth)acrylonitriles; (meth)acrylamides; 2-perfluoroalkylethyl(meth)acrylates; 2-(perhaloalkyl)ethyl(meth)acrylates; alkyl(ethyleneoxy)$_n$(meth) acrylates; amino(meth)acrylates; aryl(meth)acrylates; vinyl benzoic acids; vinyl esters; vinyl ethers; vinyl halides; vinyl phosphoric acids; vinyl sulfonic acids; vinylic anhydrides; vinylidene halides; fluorophenyl(meth)acrylates; vinyltrimethylsilanes; $C_2$ to $C_3$ hydroxyalkyl(meth)acrylates, glycidyl (meth)acrylates, alkoxysilanes; and combinations thereof.

* * * * *